(12) United States Patent
Drucker

(10) Patent No.: US 8,780,715 B2
(45) Date of Patent: Jul. 15, 2014

(54) PEAK LOAD MANAGEMENT OF A WIRELESS DATA CHANNEL

(75) Inventor: Elliott Drucker, Kirkland, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/255,905

(22) PCT Filed: May 27, 2011

(86) PCT No.: PCT/US2011/038275
§ 371 (c)(1),
(2), (4) Date: Sep. 10, 2011

(87) PCT Pub. No.: WO2012/166083
PCT Pub. Date: Dec. 6, 2012

(65) Prior Publication Data
US 2012/0300629 A1    Nov. 29, 2012

(51) Int. Cl.
*H04L 12/26* (2006.01)
*H04M 15/00* (2006.01)

(52) U.S. Cl.
USPC .................................. 370/230.1; 379/112.04

(58) Field of Classification Search
USPC ........... 379/100.03, 112.04, 112.07; 370/232, 370/235, 230.1
See application file for complete search history.

(56) References Cited

U.S. PATENT DOCUMENTS

| | | | |
|---|---|---|---|
| 7,142,512 B1 * | 11/2006 | Kobayashi et al. | 370/232 |
| 7,529,711 B2 | 5/2009 | Reith | |
| 7,765,294 B2 | 7/2010 | Edwards et al. | |
| 7,873,074 B1 * | 1/2011 | Boland | 370/468 |
| 2001/0021176 A1 * | 9/2001 | Mimura et al. | 370/235 |
| 2005/0052992 A1 * | 3/2005 | Cloonan et al. | 370/229 |
| 2007/0081469 A1 | 4/2007 | Tracy et al. | |
| 2007/0254628 A1 * | 11/2007 | Rybak | 455/405 |
| 2011/0032821 A1 * | 2/2011 | Morrill et al. | 370/230 |
| 2011/0099293 A1 | 4/2011 | Ait-Ameur et al. | |
| 2012/0084187 A1 * | 4/2012 | Sperling et al. | 705/34 |
| 2012/0106383 A1 * | 5/2012 | Gormley et al. | 370/252 |
| 2012/0108200 A1 * | 5/2012 | Rubin et al. | 455/405 |
| 2012/0131194 A1 * | 5/2012 | Morgan | 709/226 |
| 2012/0324091 A9 * | 12/2012 | Raleigh et al. | 709/224 |
| 2013/0023230 A9 * | 1/2013 | Momtahan et al. | 455/405 |

OTHER PUBLICATIONS

Notification of Transmittal of the International Search Report and the Written Opinion of the International Searching Authority, Aug. 3, 2011.
http://www.wirelessweek.com/News/2010/06/Business-ATT-Data-Use-New-Plans-Data-Services/.
http://www.telecomtv.com/comspace_newsDetail.aspx?n=46376&id=e9381817-0593-417a-8639-c4c53e2a2a10&page=2.
Notification of Transmittal of the International Serach Report and the Written Opinion of the International Searching Authority, PCT/US2011/038275, Aug. 3, 2011.

* cited by examiner

*Primary Examiner* — Dang Ton
*Assistant Examiner* — Ryan Kavleski
(74) *Attorney, Agent, or Firm* — Ren-Sheng International

(57) ABSTRACT

A method of allocating wireless data delivery services to users allows management of mobile data channel peak loading. A per-user metering structure for wireless broadband data services includes a target data throughput allowance provided to the network user for a relatively short time period known as a metering period, where a plurality of metering periods are contained in a billing period. Use of the method disclosed herein constrains the most load-impactive users, such as users streaming high-resolution videos, during periods of data channel congestion compared to typical users, such as users browsing the Internet.

19 Claims, 4 Drawing Sheets

PEAK LOAD MANAGEMENT OF A WIRELESS DATA CHANNEL

CROSS-REFERENCE TO RELATED APPLICATIONS

The present application is a 371 application of International Application PCT/US2011/038275, filed on May 27, 2011 and entitled "PEAK LOAD MANAGEMENT OF A WIRELESS DATA CHANNEL." The International Application, including any appendices or attachments thereof, is incorporated by reference herein in its entirety.

TECHNICAL FIELD

The present disclosure relates generally to wireless technologies and more specifically to peak load management of wireless data channels.

BACKGROUND

Unless otherwise indicated herein, the approaches described in this section are not prior art to the claims in this application and are not admitted to be prior art by inclusion in this section.

The use of mobile computing devices such as laptops, notebook computers, personal digital assistants (PDAs) and "smart" cellular telephones to access the Internet is becoming increasingly popular. These mobile computing devices enable users to maintain connectivity to the Internet via a wireless connection, even when moving from one location to another. Mobile computing devices have been used for "bursty" applications such as web browsing, which may benefit from high data throughput speed, but generally consume only low to modest data throughput when averaged over the time that they are in use. With the introduction of wireless broadband data services to such devices, much more data-intensive applications are now available to the mobile computing device user, including viewing high-resolution video, downloading very large music or video files, and the like. These data-intensive applications are characterized by requiring moderate to high data-transfer speed for extended periods of time.

SUMMARY

In accordance with one embodiment of the disclosure, a method for a wireless network base station to manage mobile data channel peak loading comprises receiving a request for a session for a user and performing short-term period metering for the user during the session. The session comprises, in addition to normal network session functionality, setting a timer for a metering period, the metering period being shorter than a billing period for the user, setting a data counter for the user, and, when the data counter is greater than a throughput threshold, pausing or lowering a priority of data transfer between the wireless network base station and the user.

In accordance with another embodiment of the disclosure, a method for distributing use of a wireless data channel between a first user and a second user comprises retrieving a first metering period duration and a first data transfer allowance associated with the first user and a second metering period duration and a second data transfer allowance associated with the second user, in a first metering period, transferring data between the first user and a base station of a wireless communication network via the wireless data channel at a first average data transfer speed, and in a second metering period that overlaps with the first metering period, transferring data between the second user and the base station via the wireless data channel at a second average data transfer speed that is different from the first average data transfer speed. The first average data transfer speed is determined by the first metering period duration and the first data transfer allowance. The second average data transfer speed is determined by the second metering period duration and the second data transfer allowance. The first metering period is one of a plurality of metering periods in a first billing period for the first user, and the second metering period is one of a plurality of metering periods in a second billing period for the second user.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
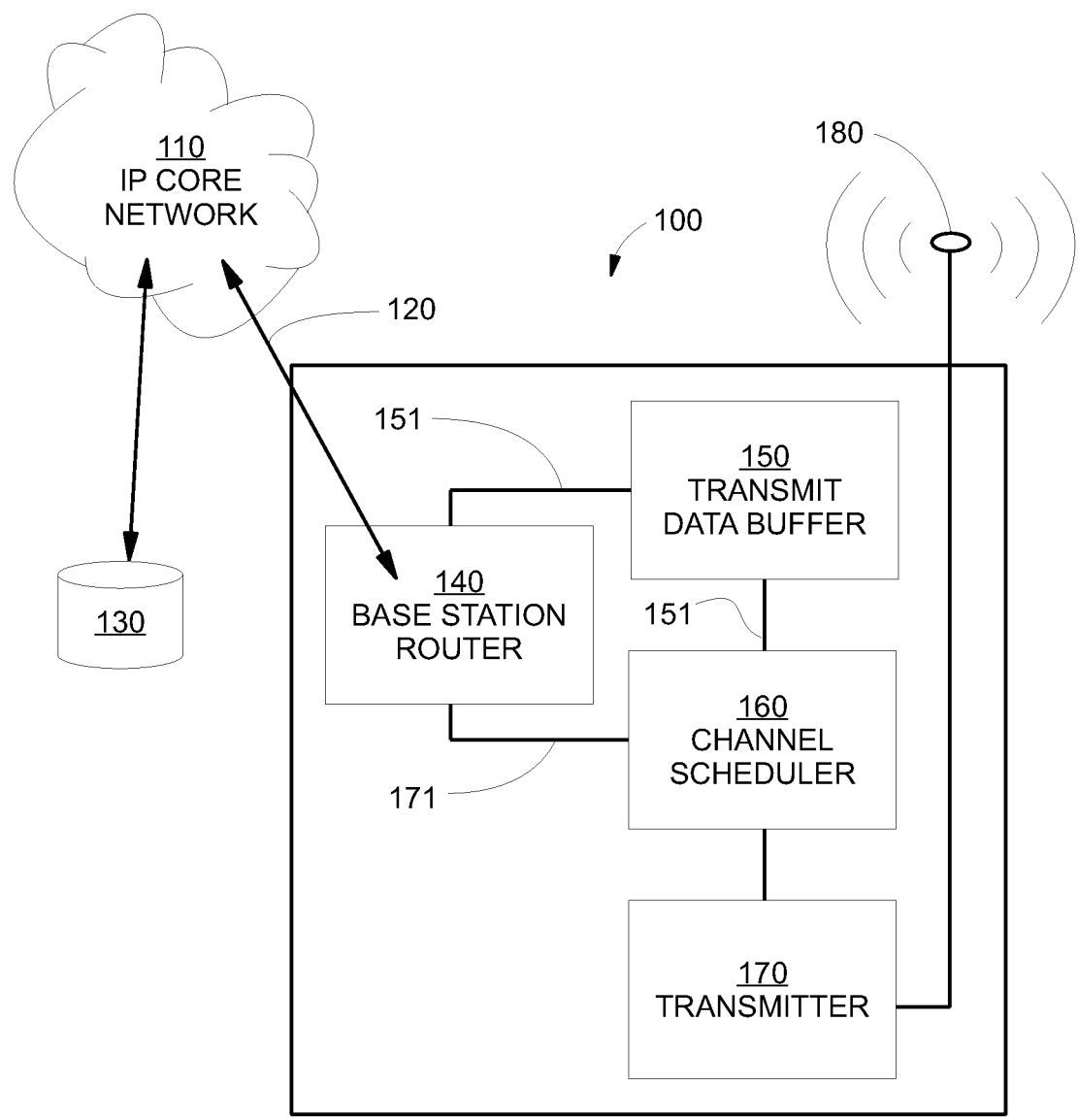
FIG. 1 shows a schematic block diagram of an illustrative embodiment of an exemplary wireless data network base station that may perform embodiments of the disclosure as well as related network elements.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the disclosure, as generally described herein, and illustrated in the Figures, can be arranged, substituted, combined, and designed in a wide variety of different configurations, all of which are explicitly contemplated and make part of this disclosure.

Widespread use of wireless broadband data services for data-intensive applications, such as streaming high-resolution videos, causes significant quality-of-service (QoS) degradation for all users of a wireless data network, even though such applications may be used by a very small percentage of the total number of users being serviced by the network. This is because wireless data networks, unlike most wire- or fiber optic-borne networks, use a physical channel of limited capacity that is shared by a number of users at the same time. Specifically, this is the radio channel that carries data traffic between a wireless network base station and the various user devices being served by the base station, and is generally the network element having the most limited capacity. Unlike, for example, fiber optic cables, which can be sized as required to provide essentially unlimited communications capacity, the practical information carrying capacity of a finite amount of spectrum is very much limited.

Without some type of control, a user of a single data-intensive application, herein referred to as an "alpha user," may consume a portion of available data-delivery capacity that is ten or even a hundred times the portion consumed by a user of a more traditional, or bursty, application, hereinafter referred to as a "beta user." An alpha user is interacting with the Internet in a way that requires continuous transfer of large quantities of data, such as streaming video, and even a short interruption or slowing of data transfer is perceived by the user and impacts QoS for that user. In contrast, good QoS for a beta user, which is generally the most common user type, requires high data throughput speeds, but only intermittently; when averaged over the time that the beta user is engaged in a data communications "session", data throughput required by a beta user is generally quite low. Typically, alpha users are a small fraction of active users on a data network, but the growing popularity of data-intensive applications has caused high levels of traffic congestion on wireless data network channels during periods of peak usage, resulting in degraded QoS for all users of the affected network. This is due to the high data throughput requirements of alpha users and the fact that the data traffic capacity of a given wireless data network sector, in terms of data throughput within a specific time period, is a limited resource that must be shared by all users being served in that sector within the specific time period.

To date, wireless broadband data services are commonly marketed to consumers on the basis of unlimited data transfer service during a given billing period for a fixed charge, where the billing period is typically a month, a day, or in some cases a number of hours. Such an approach has the significant disadvantage of effectively encouraging alpha users, even though only a small number of such users can result in degraded QoS for all network users. Alternatively, a limit on the amount of data downloaded by an individual consumer may be introduced by wireless broadband service providers to discourage the use of "bandwidth hog" applications. In such an approach, a data allowance is assigned to an individual consumer for a specific billing period, such as a day, a week or, more typically, a month. Once this data allowance has been exceeded, further use of the wireless network for Internet access is either curtailed, stopped completely, or billed at a substantially higher rate for the remainder of the billing period. However, the impact of alpha users on QoS is not caused by cumulative channel loading over a day, week, or month, but rather by the overloading of an individual base station over much shorter periods, i.e., on the order of seconds or minutes. And because downloading of a single video may only consume a small portion of a user data allowance for the billing period, the use of a fixed data allowance for a given billing period does not significantly discourage alpha users from placing high demands on the wireless network during peak usage hours. In addition, fixed data allowance schemes have the added disadvantage of limiting use of the wireless network by individual consumers who have exceeded their data allowance even at times when surplus network capacity is available.

Embodiments disclosed herein contemplate methods, hereinafter referred to as "short-term metering," for allocating wireless data delivery services to users that allow management of mobile data channel peak loading. Short-term metering is a per-user metering structure for wireless broadband data services that includes a target data throughput allowance provided to the network user for a relatively short time period known as a "metering period." The metering period may be smaller, by at least a factor a 100, than a billing period for the users. Through short-term metering, the effective utilization of available channel resources for a wireless broadband data network is maximized while maintaining acceptable QoS for the vast majority of users of the network. An additional benefit of short-term metering, as described herein, is that the most load-impactive users, i.e., alpha users, are constrained during periods of channel congestion, while allowing their unfettered operation when adequate channel capacity is available.

The term "user" and references to a user as a person are used throughout descriptions of different embodiments, and are applied as substitutions for references to user terminal devices or other applicable user equipment. Such substitutions, which are performed for the sake of narrative simplicity, will be readily understood to one knowledgeable in the art.

FIG. 1 shows a schematic block diagram of an illustrative embodiment of an exemplary wireless data network base station 100 that may perform embodiments of the disclosure as well as related network elements. Base station 100 is configured for downlink data transmitted to user devices and uplink data received from user devices, but for clarity, the architectural elements of base station 100 associated strictly with uplink data handling are not shown, and the functionality of base station 100 is described in terms of downlink data handling only. Base station 100 includes a base station router 140, a transmit buffer 150, a channel scheduler 160, and a base station transmitter 170, and is connected by a data communications backhaul link 120 to an Internet protocol (IP) core network 110.

Backhaul link 120 carries traffic data which is to be transmitted to, and received from, locations within the public Internet (not shown). The Internet connects to IP core network 110 through one or more suitable gateways. Backhaul link 120 also carries control data of various types, including information regarding specific user devices operating on the network, which is housed in a user database 130. In addition, according to embodiments of the disclosure, data regarding specific users that relates to the operation of short-term metering, for example the user's per-period target throughput allowance, may be stored in the user database.

Base station router 140 is the connection point for backhaul link 120. Base station router 140 connects to backhaul link 120 and communicates downlink traffic data 151 to transmit buffer 150. Base station router 140 also communicates control data 171 to and from channel scheduler 160. The function of channel scheduler 160 is to organize the frame-by-frame transmission of data by base station transmitter 170 via antenna 180. It is noted that base station may be "sectorized" so that it employs multiple transmitters and antenna systems, but for clarity only a single base station transmitter and a single antenna 180 is shown. The temporal granularity associated with scheduling by channel scheduler 160 may range from tens of microseconds to a few milliseconds, and is accordingly very fine compared to the metering periods of the present disclosure.

Channel scheduler 160 is also responsible for managing the data-carrying resources of the channel. Depending upon the characteristics of the channel, channel scheduler 160 may allocate such data-carrying resources to currently active users by a combination of time, spreading codes, and/or frequency. In some embodiments, channel scheduler 160 or a comparable entity performs some or all functions associated with short-term metering. Thus, different embodiments of short-term metering, as described herein, may be implemented in existing networks and their base stations with only a functional change in operation, primarily in the form of software changes for channel scheduler 160. Required enhancements to user database 130, in order to accommodate user-specific information related to embodiments of the disclosure, can be easy to implement since wireless data networks are typically designed in anticipation that enhancements requiring additional user-specific information will be introduced on an ongoing basis.

Figure 2:
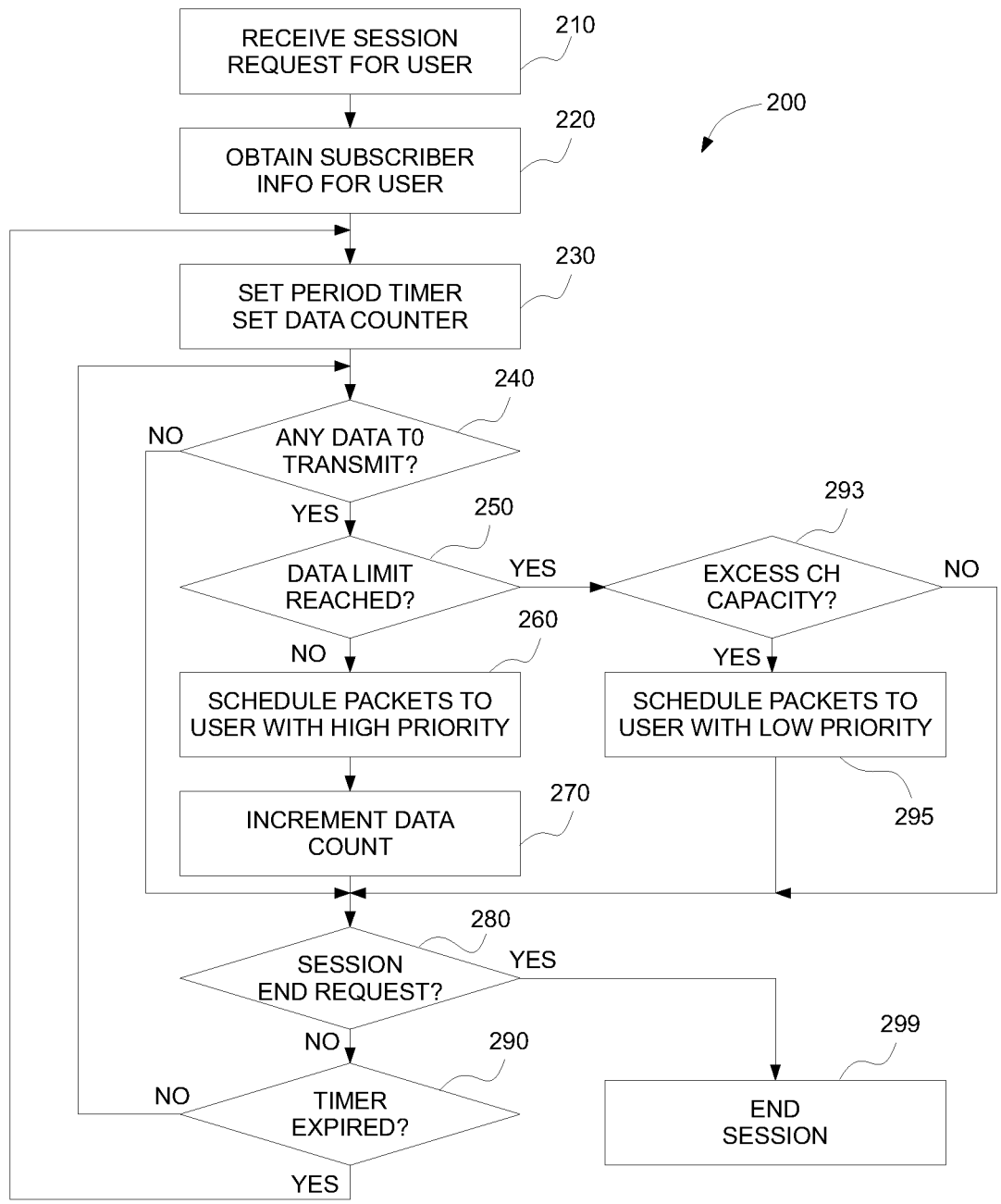
FIG. 2 sets forth a flow chart summarizing a method of short-term metering, according to an exemplary embodiment of the disclosure.

FIG. 2 sets forth a flow chart summarizing a method 200 of short-term metering, according to an exemplary embodiment of the disclosure. By way of illustration, method 200 is described in terms of a wireless data network base station substantially similar in organization and operation to wireless data network base station 100 in FIG. 1. However, other wireless data network base stations may also benefit from the use of method 200. Although the method steps are described in conjunction with FIG. 1, persons skilled in the art will understand that any system configured to perform the method steps falls within the scope of the present disclosure. This is because any combination of hardware, software, and processing that administers short term metering may reside outside of base station 100. Furthermore, at any given instant, a use may be served by two different base stations, each of which might have to participate in administration of short term metering. It will be appreciated that method 200 can be applied to both downlink (forward) and uplink (reverse) channels in wireless data networks, but for simplicity and clarity the following description of FIG. 2 will be limited to consideration of the downlink (base station transmit/user device receive) channel.

In operation 210, base station 100 receives a request for a session. The precise nature of the session request process will vary depending upon standardized protocols for the particular network in use, and any variations thereof should be considered within the scope of the disclosure.

In operation 220, base station 100 obtains required user information from one or more network user databases, such as user database 130. User information may include the per-period target throughput allowance for the user (throughput threshold), referred to in FIG. 2 as "data limit." In some embodiments, the metering period may not have the same duration for all users and/or may not be fixed with the same duration at all times. In such embodiments, user information may also include the appropriate metering period associated with the user.

In operation 230, channel scheduler 160 sets a metering period timer to the designated metering period and zeros a data counter for the user.

In operation 240, channel scheduler 160 determines whether there is any data pending transmission to the user. If no data is pending transmission to the user, the data handling process is bypassed and method 200 skips to operation 280. If data is pending transmission to the user, method 200 proceeds to operation 250.

In operation 250, channel scheduler 160 considers the user data count to determine if the target throughput allowance, i.e., the data limit, has been reached or exceeded during the current metering period. If the target throughput allowance has not been exceeded, method 200 proceeds to operation 260. If the target throughput allowance (the data limit) has been reached, method 200 proceeds to operation 293.

In operation 260, channel scheduler 160 schedules traffic data packets to be transmitted to the user with high priority.

In operation 270, channel scheduler 160 increments the data count for the user for the current metering period by the number of bytes scheduled for transmission to the user. It is noted that the "scheduling" performed by channel scheduler 160 refers to coordination of transmission of data packets to multiple simultaneous users, and deals in time periods that are extremely small relative to the short-term metering period. Method 200 then proceeds to operation 280.

In operation 293, which is performed whenever, in a given metering period, the user's target throughput allowance has been reached or exceeded in operation 250, channel scheduler 160 determines if there is currently any excess channel capacity, over and above what is required to transmit packets designated with high priority. If there is excess channel capacity, method 200 proceeds to operation 295. If not, method 200 proceeds to operation 280.

In operation 295, which is performed after operation 293 whenever there is excess channel capacity, channel scheduler 160 schedules packets for transmission to the user with low priority. Operation 295 is performed even though the target throughput allowance has been reached for the user for the current metering period. This feature allows exploitation of otherwise unused channel capacity to enhance QoS for users of high bandwidth applications. In some embodiments, for example due to various commercial reasons, channel scheduler 160 may not perform operation 295 with excess data transmissions capacity. Method 200 then proceeds to operation 280.

In operation 280, base station 100 checks for a request to terminate the current session with the user. If base station 100 detects such a request, the data handling process is abandoned, method 200 proceeds to operation 299, and the session is ended. If channel scheduler 160 does not detect such a request, the session continues, and method 200 proceeds to operation 290.

In operation 290, channel scheduler 160 considers the metering period timer. If the timer has not yet expired, processing returns to operation 240 to determine if there is any data pending for transmission within the current metering period. If the metering period timer has expired, which indicates the end of the current metering period, processing returns to operation 230, in which channel scheduler 160 resets the metering period timer to the designated metering period, and zeros the data counter for the user, to start a new metering period.

Figure 3:
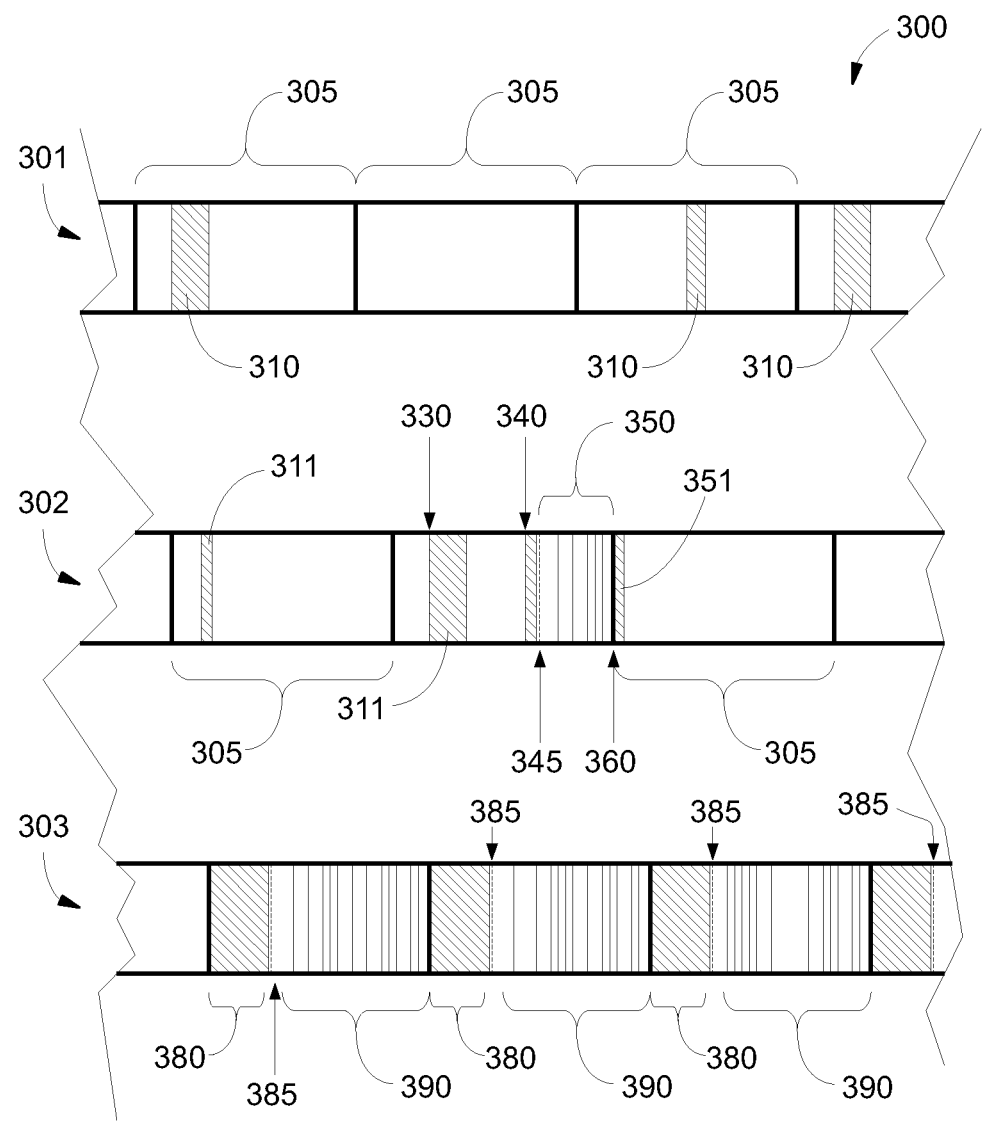
FIG. 3 shows a temporal diagram that further describes usage of a shared channel when an embodiment of the method illustrated in FIG. 2 is applied to three different users of a broadband wireless data network, according to embodiments of the disclosure.

FIG. 3 shows a temporal diagram 300 that further illustrates usage of a shared channel when an embodiment of method 200 is applied to three different simultaneous users of a broadband wireless data network channel (i.e. operating on the same channel in the same sector), according to embodiments of the disclosure. Temporal illustration 300 includes an occupancy timeline 301 for a first user of a data channel in the wireless data network, an occupancy timeline 302 for a second user of the same data channel in the wireless data network, and an occupancy timeline 303 for a third user of the same data channel in the wireless data network. Occupancy timelines 301-303 each cover approximately 3.5 metering period intervals 305 of data transport usage on the shared data channel during a time at which short-term metering is used to determine the scheduling of traffic data packets to each of the first, second, and third users. In addition, occupancy timelines 301-303 each shows channel occupancy for data being sent to the first, second, and third users, respectively.

First, second, and third users are simultaneous users of the data channel, each engaged in a different type of application. The first user is engaged in typical web browsing, and therefore is a beta user. Accordingly, occupancy timeline 301 shows occasional brief data transmissions 310 that occur intermittently throughout occupancy timeline 301. The interval between such transmissions, which corresponds to the time that the user is studying the web page most recently downloaded, is variable but generally exceeds one metering period. Since even large web page downloads are likely to be less than the per-metering period allowance, e.g., on the order of hundred of Kbytes, each web page loads at maximum possible speed, so that QoS from the perspective of the first user is excellent.

The second user is engaged in another typical beta user application, in this case downloading and looking at individual photos. Occupancy timeline 302 also shows occasional data transmissions 311 with intervals between them corresponding to the time the second user is looking at the most recently downloaded photo. In this case, however, shortly after downloading a photo at time 330 and within the same metering period, the second user decides to download another photo beginning at time 340. During the download of that photo, the second user's target throughput allowance for the current metering period is exhausted at time 345. Subsequently, and until the current metering period ends, further downloading of the photo proceeds only when there is excess channel capacity available. In the case illustrated, some additional data 350 is downloaded on this basis. With the beginning of the next metering period, the remainder 351 of the photo downloads at maximum available speed at time 360 because the data allowance refreshes with the new metering period. In the case illustrated, QoS for the second user is excellent as long as there is a modest interval between downloads of individual photos. If the second user asks for photos in quick succession, or for a sequential download of multiple photos, QoS may appear to be slightly degraded. Typical users will likely identify this characteristic of short-term metering after some experience and with suitable instruction from the network operator, and will adjust usage slightly so as to be minimally impacted.

The third user is a typical alpha user, and is attempting to watch streaming video. Accordingly, occupancy timeline 303 is very different from that of occupancy timelines 301, 302. At the beginning of each metering period there is a rapid succession of short bursts of video data 380 which end when the per-period target throughput allowance is reached at time 385. Thereafter, in each metering period, additional video data 390 is sent only when there is excess channel capacity available. The third user receives video data 380 quickly at the beginning of each metering period because until the target throughput allowance for the current metering period is exceeded, the third user receives data at a high priority. The third user receives additional video data 390 in intermittent bursts since the third user receives data at a lower priority until the next metering period begins. During off-peak periods it is likely that there will be sufficient excess capacity so that streaming video can be watched with reasonable QoS. However, if the channel is being heavily used, uninterrupted streaming video may not be available unless the user is willing to tolerate an unusually long buffering period before the video begins to play.

It is noted that in FIG. 3, the metering period boundaries for the different users are staggered in time. This is advantageous in that it serves to more evenly distribute channel loading and thus reduces average channel scheduling latencies. In addition, in the embodiment illustrated in FIG. 3, the duration of metering period intervals 305 is the same for each of the first, second, and third users. In other embodiments, the duration of metering period intervals 305 for each of the first, second, and third users may be different. For example, a user may have the option to shorten the duration of his or her associated metering period interval 305 by paying a premium to the operator of the wireless data network. Alternatively, the operator of the wireless data network may change the duration of metering period interval 305 for one or more users based on current channel loading, time of day, current channel connection quality to a particular user, or other factors.

From the channel sharing characteristics illustrated in FIG. 3, it can be appreciated that short-term metering prevents QoS for beta users from being degraded by excessive channel congestion caused by a relatively small number of alpha users. Instead, alpha users will generally suffer the most QoS degradation when channel capacity is insufficient to support them and thus be discouraged during peak loading of the network.

Another significant benefit of short-term metering is that it gives the operator of a wireless data network more direct control of peak period channel loading. Even with imposition of monthly data caps, a very small number of alpha users within the same sector can have a profound impact on channel loading. Average per-user throughput during peak loading can therefore be quite variable. Unfortunately, to maintain high QoS, the network operator must provide capacity to accommodate this variability, resulting in high capital expenditures without correspondingly high revenues. With short-term metering, the network operator can effectively control the maximum per-user throughput during peak loading periods, making it much easier to control capacity requirements. It is noted that even using embodiments of short-term metering control as described herein, control of QoS during peak loading periods will be not completely predictable, since provided capacity will still be based on statistical averaging of throughput demand for active users in a sector, and of the fraction of users that happen to be active at any given time. To with, if all of the users in a sector were active at the same time and all wanted to obtain their full target throughput allowance in every metering period, there is no practical way that the serving sector could provide sufficient capacity to maintain reasonable QoS.

An important factor in the effectiveness of short-term metering is selection of the metering period duration. This selection can be an optimal balance between QoS as observed by the user (generally in the form of peak and average throughput speeds), and management of peak channel loading. Specifically, metering period duration can be neither too long nor too short for the benefits as described herein to take effect.

Extremely short metering period durations, e.g., on the order of seconds or fractions of seconds, may be undesirable, since the effect from the user's perspective may be a reduction in peak throughput speed. When the metering period duration is very small, all users will essentially have the same priority to data channel capacity, which is effectively rate control. In other words, users will each receive data proportional to what peak data rate he or she has purchased, and alpha and beta users will therefore have the same data transfer priority at all times. This is because essentially all downloads/uploads requested by a user will require multiple metering periods to complete, even when the data transfer in question involves a relatively small quantity of data. Thus, with very short metering period durations, all users will essentially have the same data transfer priority, whether the user is an alpha user or a beta user.

Longer metering period durations, e.g., on the order of several minutes or longer, are also undesirable. Such longer duration metering periods can cause user irritation and frustration as throughput may appear to slow dramatically each time the target throughput allowance is exceeded in a metering period, e.g., whenever a user attempts to download a file that is larger than the per-period target throughput allowance. For example, a metering period having a duration of 10 minutes is generally too long with respect to user perception, since during peak loading times, a user could potentially have to wait most of the 10 minute metering period without seeing any progress in the downloading of a single relatively large file that exceeded the target per-metering period throughput allowance. With shorter metering periods (and correspondingly smaller per-metering period target throughput allowance), a very large file will not download any more quickly in such a situation, but the user will see more continuous, albeit incremental, progress.

Given these boundaries in metering period duration, there is considerable latitude in selection of metering periods which can be used by operators to optimize the performance, user quality of experience (QoE), economy, and efficiency of their networks. In some embodiments, an optimal metering period interval might be selected based on three factors A, B, and C, where A is the peak, (i.e., without loading), per-user downlink throughput speed that can be reliably provided (i.e. under radio channel quality conditions that are reliably available) by the network, B is the largest file size that the user should reliably be able to download at peak speed without interruption or speed reduction, and C is the minimum average downlink throughput speed that the user should be able to reliably obtain for downloading of files that are many times larger than largest file size B. In some embodiments, the value of minimum average downlink throughput speed C may form the primary differentiation between service level tiers. In other embodiments, the value of the peak per-user downlink throughput speed A or the largest "uninterrupted" file size B may instead be used to differentiate tiers of service.

In some embodiments, the value of the peak per-user downlink throughput speed A will be lower than the maximum theoretical per-user speed that the network can support, because the value of A should accommodate variability in channel quality within a wireless network. The term "reliably" with respect to determining the values of A, B and C should be interpreted by the operator based upon competitive strategy and other factors. For example, an operator may calculate A as the peak speed exceeded by 80% of the users in its network, whereas another operator may calculate A as the speed exceeded by 85% of users. Then, for each class of user, which may be defined by rate tier level, the operator may establish the values of B and C, which may be based on competitive strategy, observed and surveyed user preferences, and various other factors. Thus, both metering period duration and the per-period target throughput allowance can be determined by the operator based on the values selected for A, B, and C as described above.

Determining values for A, B, and C are described in terms of the downlink channel, since the downlink channel is typically dominant in considerations of QoS and loading. However, in some networks the uplink channel might be more critical, and a corresponding selection strategy for the values of A, B, and C based on the uplink channel may also be used in some embodiments.

While embodiments of short-term metering as described herein do not require the imposition of monthly data caps for users in order to manage peak loading of the network in some embodiments, an operator may impose a monthly (or daily, weekly, etc.) data cap in addition to a short-term metering scheme to discourage generally excessive use by a small number of network users.

Figure 4:
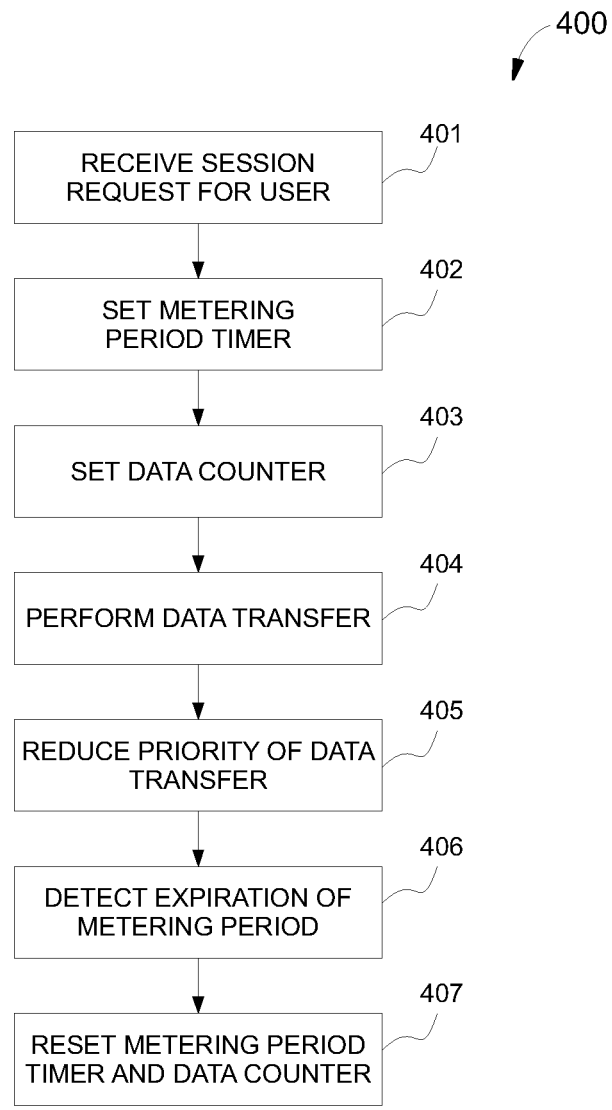
FIG. 4 sets forth a flow chart summarizing a method for a wireless network base station to manage mobile data channel peak loading, according to an exemplary embodiment of the disclosure.

FIG. 4 sets forth a flow chart summarizing a method 400 for a wireless network base station to manage mobile data channel peak loading, according to an exemplary embodiment of the disclosure. It will be appreciated that method 400 can be applied to both downlink (forward) and uplink (reverse) channels in wireless data networks, but for simplicity and clarity, the following description of FIG. 4 will be limited to consideration of the downlink (base station transmit/user device receive) channel.

In operation 401, during a peak usage period of the day, a base station in a wireless data network receives a request for a session from a first user.

In operation 402, the channel scheduler or comparable entity in the base station sets a timer for a metering period, the metering period being much shorter than a billing period for the user. As described above, the metering period may be based on a number of factors, e.g., the values of A, B, and C. In addition, the duration of the metering period may be different for the same user depending on certain factors, such as the current channel quality of a mobile data channel between the user and the base station. It is noted that the duration of the metering period is very much less than the duration of the billing period, the latter of which may be on the order of an hour, a day, or a month. In some embodiments, the duration of the metering period is on the order of about 1 minute, i.e., between about 10 seconds and about 5 minutes.

In operation 403, the channel scheduler sets a data counter for the user.

In operation 404, while the data counter is less than a throughput threshold for the metering period, the channel scheduler performs a data transfer between the user and the base station.

In operation 405, the channel scheduler detects that the data counter is greater than the throughput threshold, and pauses or lowers the priority of the data transfer between the base station and the user.

In operation 406, the channel scheduler detects that the metering period has expired.

In operation 407, the channel scheduler resets the timer and the data counter and resumes or increases the priority of the data transfer, i.e., method 400 returns to operation 402. Method 400 continues until the base station receives a request to terminate the data transfer session.

In sum, embodiments of the disclosure provide a method of short-term metering of wireless data delivery services to users of a wireless data network. One advantage of the disclosure set forth herein is that users of data-intensive applications, i.e., the so-called "alpha" users, are discouraged during peak load times for the wireless network, while "beta" users are not. Consequently, peak usage of the network is more closely tied to the number of users currently accessing the network, and is less likely to be skewed by excessive use by a small number of high-intensity users. Thus, a network operator can more effectively control the maximum per-user throughput of the network during peak loading hours. Furthermore, revenues associated with operation of wireless data networks are typically more closely tied to number of users than to peak traffic levels, but network capital investment is closely tied to required peak traffic capacity. Another advantage of the disclosure set forth herein is thus a closer relationship between required capital outlay for network deployment and revenues generated by network operation.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of X, Y, and Z, etc." is used, in general such a construction is intended in the sense one having skill in the art would understand the convention (e.g., "a system having at least one of X, Y, and Z" would include but not be limited to systems that have X alone, Y alone, Z alone, X and Y together, X and Z together, Y and Z together, and/or X, Y, and Z together, etc.). In those instances where a convention analogous to "at least one of X, Y, or Z, etc." is used, in general such a construction is intended in the sense one having skill in the art would understand the convention (e.g., "a system having at least one of X, Y, or Z" would include but not be limited to systems that have X alone, Y alone, Z alone, X and Y together, X and Z together, Y and Z together, and/or X, Y, and Z together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "or Y" will be understood to include the possibilities of " " or "Y" or "and Y."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for a wireless network including a base station to manage mobile data channel peak loading, the method comprising:

during a period of active data transfer between the wireless network and a first user device, performing short-term period metering of data transmission on at least one of an uplink and a downlink between the base station and the first user device, the short-term period metering comprising:

setting a timer that resides in the wireless network for a metering period associated with the first user device, the metering period being shorter than the period of active data transfer;

setting a data counter that resides in the wireless network for the first user device; and in response to the data counter indicating an amount of data transfer during the metering period is greater than a throughput threshold, scheduling data for transmission to or from the first user device during a remainder portion of the metering period with a reduced priority for the remainder portion of the metering period.

2. The method of claim 1, wherein the data transfer session comprises multiple metering periods.

3. The method of claim 1, wherein the metering period is between about ten seconds and one minute.

4. The method of claim 1, wherein scheduling data for transmission to or from the first user device with a reduced priority comprises scheduling a data transmission only if the base station has excess capacity during the metering period.

5. The method of claim 1, further comprising selecting the throughput threshold, the metering period, or a combination of both, based on a billing rate associated with the first user device.

6. The method of claim 1, further comprising performing a data transfer between a second user device and the base station in another metering period associated with the second user device that overlaps with the metering period of the first user device and has a beginning point that is offset in time from a beginning point of the metering period of the first user device.

7. The method of claim 1, wherein performing short-term period metering further comprises, when the metering period expires:

resetting the timer and the data counter.

8. The method of claim 1, wherein a billing period associated with the first user device is at least about one hour.

9. The method of claim 1, further comprising, after a predetermined quantity of data has been transferred between the first user device and the base station during a billing period associated with the user first device, pausing or lowering a priority of data transfer with the first user device for a remainder of the billing period.

10. The method of claim 1, further comprising incrementing or decrementinq the data counter to reflect data transfer associated with the first user device.

11. The method of claim 1, wherein performing short-term period metering occurs during one or more periods of the day or during the entire day.

12. The method of claim 1, further comprising varying the throughput threshold, the metering period, or a combination of both based on a selected average throughput rate associated with the first user device.

13. A method for a base station of a wireless network to apportion, between a first user device and a second user device, use of at least one of an uplink wireless data channel and a downlink wireless data channel, the method comprising:

retrieving a first metering period duration and a first data transfer allowance associated with the first user device and a second metering period duration and a second data transfer allowance associated with the second user device;

in a first metering period, transferring data between the first user device and a base station of a wireless communication network via the wireless data channel at a first reduced data transfer priority in response to an amount of data transmitted to or from the first user device during the first metering period exceeding the first transfer allowance; and in a second metering period that overlaps with the first metering period, transferring data between the second user and the base station via the wireless data channel at a second reduced data transfer priority in response to an amount of data transmitted to or from the second user device during the second metering period exceeding the second data transfer allowance, and wherein the first metering period is one of a plurality of concatenated first metering periods in a data transfer session with the first user device and the second metering period is one of a plurality of concatenated second metering periods in a data transfer session with the second user device.

14. The method of claim 13, wherein transferring data between the first user device and the base station of the wireless communication network at the first reduced data transfer priority comprises transferring data only if the base station has excess capacity during the first metering period.

15. The method of claim 13, wherein transferring data between the second user and the base station at the second reduced data transfer priority comprises transferring data only if the base station has excess capacity during the current second metering period.

16. The method of claim 15, wherein the first reduced data transfer priority is different from the second reduced data transfer priority.

17. The method of claim 13, wherein the first metering period duration is different than the second metering period duration.

18. The method of claim 13, wherein the first metering period duration is substantially the same as the second metering period duration.

19. The method of claim 18, wherein the first metering period has a beginning point that is offset in time from a beginning point of the second metering period.

* * * * *